Patented Aug. 1, 1933

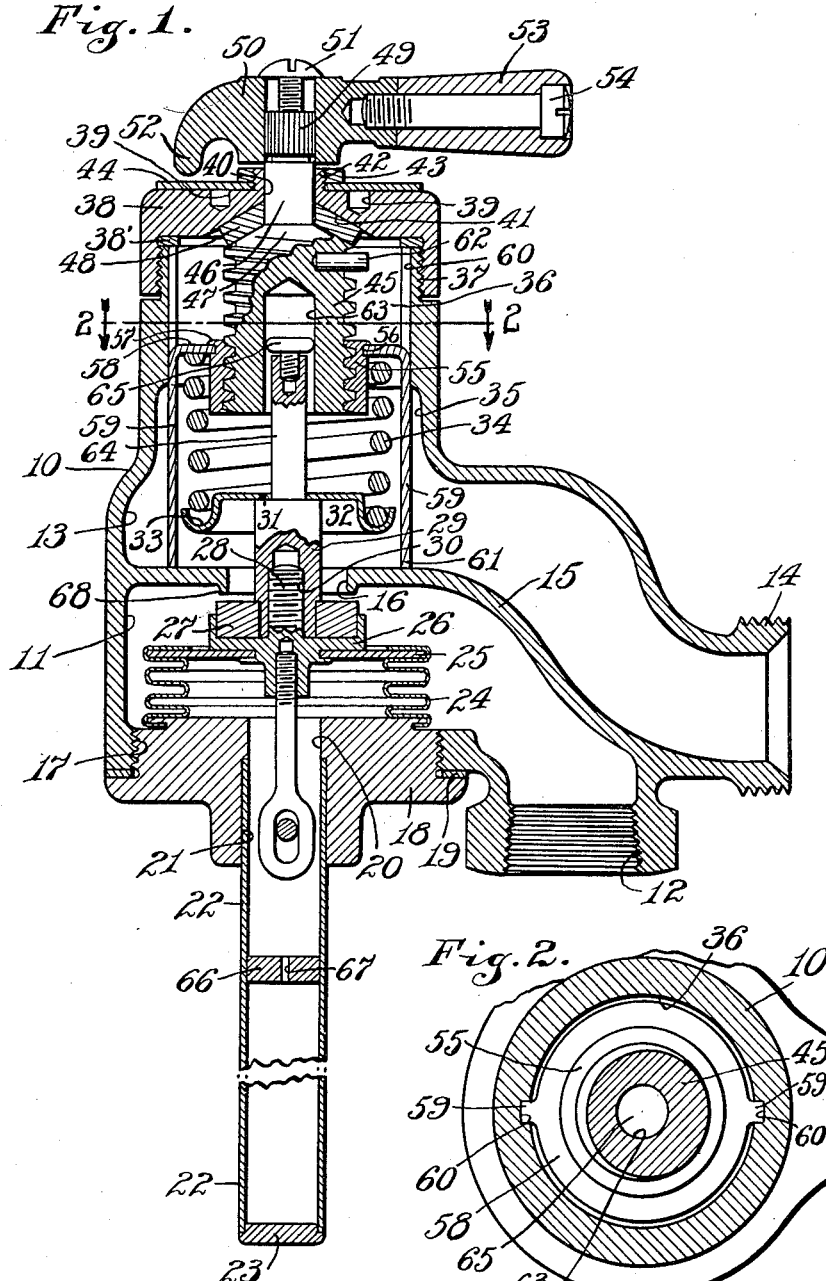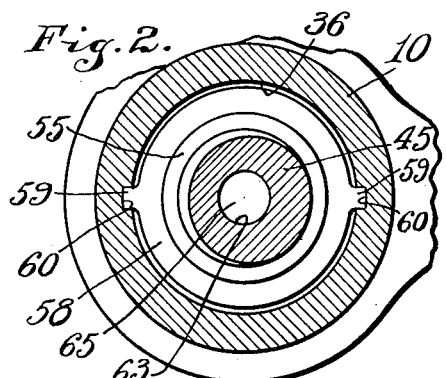

1,920,896

UNITED STATES PATENT OFFICE 1,920,896

RADIATOR VALVE

Paul F. Shivers, Wabash, Ind., assignor to Minneapolis-Honeywell Regulator Company, Minneapolis, Minn., a Corporation of Delaware Application May 12, 1930. Serial No. 451,585

3 Claims. (Cl. 236—42)

The present application relates, as indicated, to a radiator valve, and more particularly to that type of valve adapted to be applied to control the flow of heated fluid to an individual radiator and in which the operation of the valve is automatically controlled by thermo-sensitive means, manual adjusting means being provided. Broadly, the object of the invention is to improve valves of the type indicated, the improvements, in the present instance, residing in refinements of construction and operation, as will appear hereinafter.

In the drawing forming a part of this application, Fig. 1 is a central vertical section through an embodiment of my invention, and Fig. 2 is a section taken substantially upon the line 2—2 of Fig. 1.

Referring more particularly to the drawing, it will be seen that I have provided a casing indicated generaly at 10 and formed to provide an inlet chamber 11 having an internally threaded hub 12 for connection to a pipe; an outlet chamber 13 having an externally threaded hub 14 for connection to a radiator; and a partition 15 separating said chambers 11 and 13 and formed with a port 16 therethrough providing communication betwen said chambers.

The external wall of the inlet chamber 11 is formed with an aperture 17 coaxial with the port 16 and internally threaded for reception of a closure plate or plug 18, a washer 19 being clamped between the casing and a flange on said plug 18. The closure plug 18 is formed with a central bore 20 provided with an enlarged portion 21 adjacent its outer end in which is sealed one end of a tube 22, the opposite end of said tube being closed by a plug 23. One end of a bellows 24 is securely anchored in any suitable manner to the inner end of the plug 18, the opposite end of said bellows being closed by a plate 25.

As will be seen, the bellows 24 and the tube 22 comprise an expansible and collapsible chamber, the inner end of the tube 22 being in communication with the interior of the bellows 24 through the bore 20. Anchored to the plate 25 is a valve cup 26 receiving a valve head 27 of suitable material for cooperation with the flange or seat 63 surrounding the port 16. As will be obvious, the collapsible chamber above mentioned is adapted to contain a volatile thermo-sensitive fluid whereby temperature changes affecting the tube 22 will result in expansion or collapse of such bellows to move the valve member 27 toward or away from its seat 68.

The cup 26 is provided with a central threaded stud 28 projecting beyond the upper surface of the head 27 and threaded into a socket 30 in a valve stem 29. Said stem projects through the port 16 and into the outlet chamber 13, being formed, within said chamber, with an outwardly facing shoulder 31 upon which is seated a spring abutment 32 formed with an annular cup 33 for the reception of one end of a coiled spring 34.

The outlet chamber 13 is formed with a cylindrical extension 35 substantially coaxial with the port 16 and providing a reduced outer portion 36. The outer extremity of said portion 36 is formed with a reduced externally threaded neck 37 for the reception of a bonnet 38. Preferably the bonnet 38 is formed on its outer end surface with a pair of recesses 39 for the reception of a spanner wrench to facilitate the mounting of said bonnet on said neck; and a washer 38' is clamped between said bonnet and the extremity of said neck.

The bonnet 38 is formed with a central bore 40, the inner end of which is conically flared, as shown at 41. An annular externally threaded flange 42 surrounds the bore 40 and receives a nut 43 for clamping in place an escutcheon plate 44, preferably provided with legends for indicating the setting of the valve mechanism.

An adjusting means comprises an externally threaded member 45 received within the portion 36 of the outlet chamber 13, a reduced stem 46 received within the bore 40, and a flared shoulder 47 connecting said portions 45 and 46 and conforming in shape to the flared portion 41 of the bore 40. A packing washer 48 is preferably received between the shoulder 47 and said flared portion 41. At its outer end, the reduced stem 46 is knurled, as indicated at 49, for the reception of a handle 50, said handle being secured in place by a screw 51 threaded into said stem 46. The handle 50 is formed with a finger 52 for indicating cooperation with the escutcheon plate 44, and a finger piece 53 of heat insulating material is secured to said handle by a screw or stud 54.

Threadedly mounted on the member 45 within the portion 36 of the outlet chamber 13 is a nut 55, the same being provided with a peripheral groove 56 for the reception of a collar 58, the upper end of the nut 55 being upset, as at 57, to clamp said collar 58 rigidly in said groove 56. The collar 58 is provided with a pair of diametrically spaced depending fingers 59, said fingers being received in longitudinally extending slots 60 in the portion 36 of the outlet chamber 13. It will be obvious that the engagement of the fingers 59 in the slots 60 prevents rotation of the collar 58 and, in view of the rigid engagement of the collar 58 in the groove 56, rotation of the nut 55 is likewise prevented. The extremities 61 of the fingers 59 are adapted to engage the partition 15 to limit downward movement, and a pin 62 is positioned adjacent the upper end of the member 45 to limit upward movement of the nut 55.

The member 45 is provided in its inner end with a cylindrical socket 63 receiving the upper end of the reduced extension 64 of the stem 29, and a member 65 is removably secured in the extremity of said projection 64, said member 65 snugly fitting the walls of the socket 63, whereby the stem 29, and consequently the valve cup 26 and valve 27, are restricted to straight line movement.

Within the tube 22 and adjacent the end thereof which is received in the bore 21, there is mounted an orifice plate 66 formed with an aperture 67 of a diameter much less than that of the tube 22.

While the operation of the illustrated device is believed to be perfectly clear, a short statement thereof may be made. The hub 12 is connected to a pipe leading from a source of heated fluid, and the hub 14 is connected to a radiator. The handle 50 is moved until the finger 52 comes into registry with a legend indicating a desired room temperature. Such oscillation of the handle 50 causes rotation of the member 45. The nut 55 being restrained against rotation, such rotation of the member 45 results in an upward or downward movement of the nut 55. The spring 34 being constrained between the collar 58 and the seat 32, such movement of the nut 55 results in a decrease or increase in the degree of compression of said spring 34.

As will be obvious, the tendency of the spring 34 is to hold the valve 27 off its seat 68. The valve 27 can be moved to engagement with its seat only by expansion of the bellows 24 caused by thermal expansion of the fluid contained in said bellows and in the tube 22. As long, then, as the temperature of the room in which the tube 22 is positioned is below that indicated by the finger 52, the valve 27 will remain open to permit a flow of heating fluid to the radiator. When, however, the room temperature reaches the desired value, expansion of the fluid in the tube 22 and in the bellows 24 overcomes the force of the spring 34 and moves the valve 27 into engagement with its seat 68.

The orifice plate 66 reduces the rate of circulation of the thermo-sensitive fluid in the expansible chamber, so that the effect of the heating fluid in the chamber 11 upon the thermo-sensitive fluid in the expansible chamber is substantially limited to the fluid in that portion of the chamber above the orifice plate 66. The fluid in the portion of the tube beyond the orifice plate 66 is thus affected by room temperature almost entirely without relation to the temperature of the heating fluid in the chamber 11. The result of this arrangement, of course, is much more sensitive response of the instrument to room temperature as distinguished from response of the instrument to heating fluid temperature.

It will be seen that I have provided a device of the character indicated whereby improved results can be attained through the use of simplified mechanism. Packing is substantially dispensed with, the whole interior of the casing being open to the heating fluid. The number of moving parts is reduced to a minimum, so that the life of the instrument is materially increased.

I claim as my invention:

1. Thermo-responsive valve mechanism comprising a casing provided with an inlet passage and an outlet passage, a partition separating said passages and provided with a port, a valve seat surrounding said port, a valve in said inlet passage and movable into and out of cooperable relation with said seat, thermo-sensitive means tending, upon increase in the temperature thereof, to move said valve toward said seat, a stem on said valve and projecting into said outlet passage, an abutment on said stem, a spring engaging said abutment, a threaded element in said outlet passage, a projection on said element and extending outside said casing, a nut threadedly mounted on said threaded element and providing an abutment for the opposite end of said spring, means engaging said projection for rotating said threaded element, and a plurality of fingers on said nut slidably received in grooves in said casing for preventing rotation of said nut.

2. Valve mechanism comprising a casing formed to provide an inlet chamber and an outlet chamber, and a partition separating said chambers and provided with a port therein, said inlet chamber having an opening in its wall coaxial with said port, and said outlet chamber having a cylindrical extension coaxial with said port, a closure plate for said opening, a reduced, externally threaded neck at the extremity of said extension, a bonnet received on said neck and formed with a bore therein substantially coaxial with said port, the inner end of said bore being flared, an adjusting means mounted in said extension and comprising an externally threaded member, a reduced stem, and a conical shoulder connecting said threaded member and said stem and received in the flared portion of said bore, a nut on said threaded member, a collar rigidly carried by said nut and provided with radially extending projections, said extension being formed with grooves receiving said projections, a valve mounted in said inlet chamber for cooperation with said port, a stem on said valve and projecting through said port, an abutment on said stem, and a spring abutting, at its one end, said abutment, and at its other end said collar, said adjusting means being operable, upon rotation of said threaded member, to vary the degree of compression of said spring.

3. Valve mechanism comprising a casing formed to provide an inlet chamber and an outlet chamber and a partition separating said chambers and provided with a port therein, a valve in one of said chambers, means for moving said valve into closing relation with said port, a stem on said valve and projecting through said port, and abutment on said stem, an adjusting member mounted for rotation in the other of said chambers, means cooperating with said member and comprising an abutment adapted to be reciprocated upon rotation of said adjusting member, resilient means received between said last-mentioned abutment and said stem abutment, said adjusting member being formed with a cylindrical socket rotatably and slidably receiving the extremity of said valve stem, and an element carried by said stem and snugly fitting the interior of said socket.

PAUL F. SHIVERS.